United States Patent
Earl et al.

(10) Patent No.: US 9,612,160 B2
(45) Date of Patent: Apr. 4, 2017

(54) EMISSIVITY INDEPENDENT OPTICAL PYROMETER

(71) Applicant: UT-Battelle, LLC, Oak Ridge, TN (US)

(72) Inventors: Dennis Duncan Earl, Knoxville, TN (US); Roger A. Kisner, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 405 days.

(21) Appl. No.: 14/072,380

(22) Filed: Nov. 5, 2013

(65) Prior Publication Data

US 2015/0124244 A1 May 7, 2015

(51) Int. Cl.
*G01J 5/08* (2006.01)
*G01J 5/00* (2006.01)
*G01J 5/60* (2006.01)

(52) U.S. Cl.
CPC .......... *G01J 5/0862* (2013.01); *G01J 5/0003* (2013.01); *G01J 5/0821* (2013.01); *G01J 5/0896* (2013.01);
(Continued)

(58) Field of Classification Search
CPC ...... G01J 5/0862; G01J 5/0003; G01J 5/0896; G01J 5/601; G01J 5/0821;
(Continued)

(56) References Cited

U.S. PATENT DOCUMENTS 3,579,775 A * 5/1971 Carlson .............. B23Q 17/0985
356/44
3,698,813 A * 10/1972 Aisenberg ............... G01J 5/524
250/227.11
(Continued)

OTHER PUBLICATIONS

Deemyad, Shanti et al., "Strategy and enhanced temperature determination in a laser heated diamond anvil cell," 2009, Journal of Applied Physics 105(9):093543, pp. 1-22.*
(Continued)

*Primary Examiner* — Gordon J Stock, Jr.
(74) *Attorney, Agent, or Firm* — Klarquist Sparkman, LLP

(57) ABSTRACT

Disclosed herein are representative embodiments of methods, apparatus, and systems for determining the temperature of an object using an optical pyrometer. Certain embodiments of the disclosed technology allow for making optical temperature measurements that are independent of the surface emissivity of the object being sensed. In one of the exemplary embodiments disclosed herein, a plurality of spectral radiance measurements at a plurality of wavelengths is received from a surface of an object being measured. The plurality of the spectral radiance measurements is fit to a scaled version of a black body curve, the fitting comprising determining a temperature of the scaled version of the black body curve. The temperature is then output. The present disclosure is not to be construed as limiting and is instead directed toward all novel and nonobvious features and aspects of the various disclosed embodiments, alone or in various combinations and subcombinations with one another.

29 Claims, 11 Drawing Sheets

(52) U.S. Cl.
CPC ....... *G01J 5/601* (2013.01); *G01J 2005/0048* (2013.01)

(58) Field of Classification Search
CPC ....... G01J 2005/0048; G01J 2005/0051; G01J 2005/0055; G01J 2005/0059
See application file for complete search history.

(56) References Cited

U.S. PATENT DOCUMENTS

| | | | | |
|---|---|---|---|---|
| 4,313,344 | A * | 2/1982 | Brogardh | G01J 5/0044 374/126 |
| 5,772,323 | A | 6/1998 | Felice | |
| 5,822,222 | A * | 10/1998 | Kaplinsky | G01J 5/60 250/316.1 |
| 6,379,038 | B1 | 4/2002 | Felice | |
| 6,398,406 | B1 * | 6/2002 | Breiland | G01J 5/524 356/43 |
| 2005/0236563 | A1 * | 10/2005 | Busch | G01J 3/28 250/252.1 |
| 2006/0255017 | A1 * | 11/2006 | Markle | G01J 5/0003 219/121.62 |
| 2010/0246631 | A1 * | 9/2010 | Barlett | G01J 5/60 374/2 |

OTHER PUBLICATIONS

Madura, H. et al., "Automatic compensation of emissivity in three-wavelength pyrometers," 2007, Infrared Physics and Technology 51, pp. 1-8.*

* cited by examiner

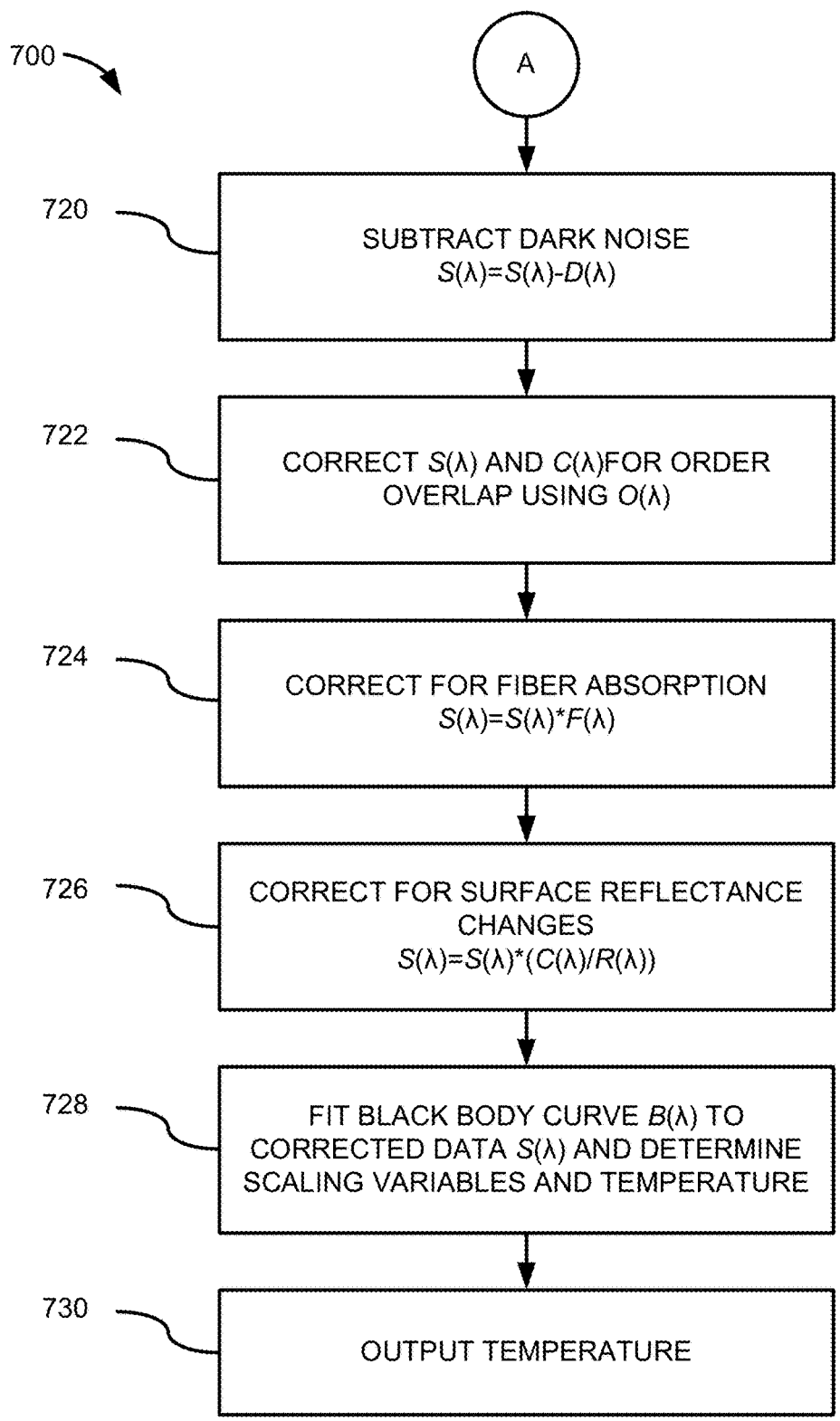

EMISSIVITY INDEPENDENT OPTICAL PYROMETER

STATEMENT REGARDING FEDERALLY SPONSORED RESEARCH OR DEVELOPMENT

This invention was made with government support under Contract No. DE-AC05-00OR22725 awarded by the U.S. Department of Energy. The government has certain rights in the invention.

FIELD

This application relates generally to the field of optical pyrometry.

SUMMARY

Disclosed below are representative embodiments of methods, apparatus, and systems for determining the temperature of an object using an optical pyrometer. Certain embodiments of the disclosed technology allow for making optical temperature measurements that are independent of the surface emissivity of the object being sensed. The disclosed methods, apparatus, and systems should not be construed as limiting in any way. Instead, the present disclosure is directed toward all novel and nonobvious features and aspects of the various disclosed embodiments, alone or in various combinations and subcombinations with one another.

One of the exemplary embodiments disclosed herein is a method in which a plurality of spectral radiance measurements is received at a plurality of wavelengths from a surface of an object. The plurality of the spectral radiance measurements is fit to a scaled version of a black body curve. As part of the fitting, the temperature of the scaled version of the black body curve is determined. The temperature for the scaled version of the black body curve that fits the plurality of the spectral radiance measurements is then output. In certain implementations, the wavelengths in the plurality of wavelengths are contiguous wavelengths. In some implementations, the method further comprises correcting the received plurality of spectral radiance measurements for one or more of dark noise, order overlap effects, or optical fiber absorption. The received plurality of spectral radiance measurements can also be corrected for surface reflectance changes. In certain implementations, the plurality of spectral radiance measurements is received from an indium gallium arsenide spectrometer. In some implementations, the fitting comprises determining two or more scaling variables of the scaled version of the black body curve. In certain implementations, the fitting is performed using the Levenberg-Marquardt technique with Savitzky-Golay data smoothing techniques. In some implementations, the fitting is performed independent of emissivity variations on the surface of the object observed at one or more of the wavelengths. In certain implementations, before the fitting step, one or more of a dark noise baseline measurement, an order overlap baseline measurement, or a fiber absorption baseline measurement are obtained. Surface reflectance measurements can also be obtained before the fitting step from the surface of the object when the object is at a temperature lower than at the time the plurality of spectral radiance measurements is received. The method can be implemented by one or more non-transitory computer-readable media storing computer-executable instructions which, when executed by a computer, cause the computer to perform the method.

Another exemplary embodiment disclosed herein is a system for performing optical pyrometry comprising: an optical fiber, the optical fiber having a first end and a second end, the first end of the optical fiber being oriented toward, but not contacting, a surface of an object whose temperature is to be measured; a spectrometer, the spectrometer being coupled with the second end of the optical fiber and configured to receive light transmitted by the optical fiber and emitted by the surface of the object, the spectrometer being further configured to produce spectral radiance measurements across a range of different wavelengths; and computing hardware communicatively coupled to the spectrometer, the computing hardware being configured to receive the spectral radiance measurements from across the range of different wavelengths and determine one or more variables of a black body curve model so that the black body curve model fits the received spectral radiance measurements, the one or more variables including temperature. In certain implementations, the spectrometer is one of an indium gallium arsenide spectrometer, a silicon spectrometer, a lead selenide spectrometer, an indium antimonide spectrometer, a mercury cadmium telluride spectrometer, or a bolometer. In some implementations, the spectrometer is configured to produce spectral radiance measurements in a range from within 700 nm to 5000 nm (e.g., in a range from within 900 nm to 2500 nm). In certain implementations, the optical fiber has a pass band in a range from within 100 nm to 5000 nm. In some implementations, the different wavelengths in the range of different wavelengths are contiguous wavelengths.

A further exemplary embodiment disclosed herein is a system for performing optical pyrometry comprising: a bundle of one or more optical fibers, the bundle of optical fibers having an end oriented toward, but not contacting, a surface of an object whose temperature is to be measured, the bundle comprising a first set of one or more of the optical fibers having a first end opposite the end oriented toward the surface of the object, the bundle further comprising a second set of one or more of the optical fibers having a second end opposite the end oriented toward the surface of the object; an illumination source, the first end of the first set of one or more of the optical fibers being positioned adjacent to the illumination source such that light from the illumination source is transmissible through the first set of one or more of the optical fibers to illuminate the surface of the object; a spectrometer, the spectrometer being coupled to the second end of the second set of one or more of the optical fibers, the spectrometer being configured to receive light emitted by the surface of the object, the spectrometer being further configured to produce spectral radiance measurements across a range of different wavelengths; and computing hardware communicatively coupled to the spectrometer, the computing hardware being configured to receive the spectral radiance measurements from across the range of different wavelengths and determine one or more variables of a black body curve model so that the black body curve model fits the received spectral radiance measurements, the one or more variables including temperature. In some implementations, the different wavelengths in the range of different wavelengths are contiguous wavelengths. In certain implementations, the illumination source is a broad spectrum light source. In some implementations, the one or more of the optical fibers in the first set are located central to the one or more optical fibers in the second set. In certain implementations, the light from the illumination source can be selectively transmitted to the surface of the object.

Another one of the exemplary embodiments disclosed herein is a method implemented in an optical pyrometry system. In this embodiment, a spectrum of radiance measurements at a plurality of wavelengths is received from a surface of an object being measured. The spectrum is corrected for (a) dark noise in the optical pyrometry system, (b) spectrometer order overlap, and (c) absorption in optical fibers used to transmit the spectrum, and thereby producing a corrected spectrum. The corrected spectrum is fit to a black body curve model. As part of the fitting, the temperature of the black body curve model is determined. In certain implementations, before the fitting, a dark noise baseline measurement, an order overlap baseline measurement, and a fiber absorption baseline measurement are obtained. The method can be implemented by one or more non-transitory computer-readable media storing computer-executable instructions which when executed by a computer cause the computer to perform the method.

A further one of the exemplary embodiments disclosed herein is a method implemented in an optical pyrometry system. In this embodiment, a first spectrum of radiance measurements at a plurality of wavelengths is received from a surface of an object being measured. Light from an external light source is transmitted onto the surface of the object being measured. A second spectrum of radiance measurements at the plurality of wavelengths is received from the surface of the object being measured as the object is illuminated by the external light source. The first spectrum is corrected for surface reflectance changes, thereby generating a corrected spectrum based at least in part on the second spectrum. The corrected spectrum is fit to a black body curve model. As part of the fitting, a temperature of the black body curve model is determined. In certain implementations, the first spectrum is corrected for (a) dark noise in the optical pyrometry system, (b) spectrometer order overlap, and (c) absorption in optical fibers used to transmit the spectrum. In some implementations, before the fitting, a material reflectance spectrum of the object at room temperature is obtained. In certain implementations, before the fitting, a dark noise baseline measurement, an order overlap baseline measurement, and a fiber absorption baseline measurement are obtained. The method can be implemented by one or more non-transitory computer-readable media storing computer-executable instructions which when executed by a computer cause the computer to perform the method.

The foregoing and other objects, features, and advantages of the disclosed technology will become more apparent from the following detailed description, which proceeds with reference to the accompanying figures.

BRIEF DESCRIPTION OF THE DRAWINGS

FIGS. 7A and 7B show a flow chart of an exemplary embodiment of computing temperature according to the disclosed technology with an external light source.

DETAILED DESCRIPTION

I. General Considerations

Figure 1:
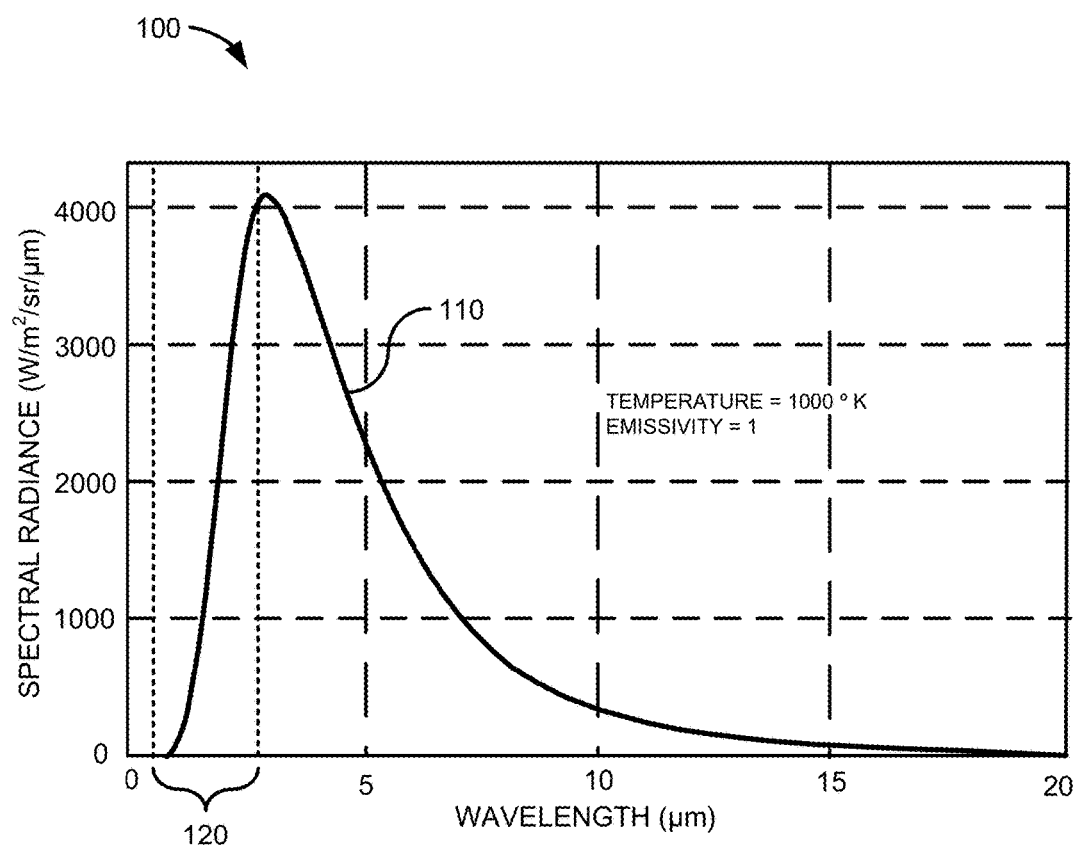
FIG. 1 is a graph illustrating an example black body curve.

Disclosed below are representative embodiments of methods, apparatus, and systems for determining the temperature of an object using an optical pyrometer. Certain embodiments of the disclosed technology allow for making optical temperature measurements that are independent of the surface emissivity of the object being sensed. The disclosed methods, apparatus, and systems should not be construed as limiting in any way. Instead, the present disclosure is directed toward all novel and nonobvious features and aspects of the various disclosed embodiments, alone or in various combinations and subcombinations with one another. Furthermore, any features or aspects of the disclosed embodiments can be used in various combinations or subcombinations with one another. For example, one or more method steps from one embodiment can be used with one or more method steps from another embodiment and vice versa. The disclosed methods, apparatus, and systems are not limited to any specific aspect or feature or combination thereof, nor do the disclosed embodiments require that any one or more specific advantages be present or problems be solved.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods. Additionally, the description sometimes uses terms like "determine," "fit," and "correct," to describe the disclosed methods. These terms are high-level abstractions of the actual operations that are performed. The actual operations that correspond to these terms may vary depending on the particular implementation and are readily discernible by one of ordinary skill in the art. Furthermore, in general, the term "best fit" describes a solution that satisfies some set of criteria better than other solutions according to some parameterization or modeling, which may or may not be optimal in absolute terms depending on circumstances. Additionally, the term "and/or" means any one item or combination of items in the phrase.

II. Introduction to the Disclosed Technology

If an object approximates a theoretical black body, its surface emits light with a spectral intensity that closely follows a black body curve. In general, a black body curve is a representation of spectral radiance or intensity relative to wavelength for an object at a particular temperature. The black body curve can be defined, for example, by the following model:

$$B(\lambda) = \frac{2hc}{\lambda^3}\left(\frac{1}{e^{\frac{hc}{\lambda kT}} - 1}\right), \quad (1)$$

where B is the spectral radiance at a wavelength λ, h is Planck's constant (J-s), c is the speed of light (m/s), k is Boltzmann's constant (J/K), and T is temperature in degrees Kelvin.

FIG. 1 is a graph 100 that illustrates an exemplary black body curve 110 for a black body at 1000° K and assumes an emissivity (ε) of "1" (an idealized black body). If the radiant intensity of an object that behaves as a black body at a given wavelength matches the intensity shown by the curve in FIG. 1, then it can be determined that the object has a temperature of 1000° K. For instance, by measuring the radiance of an object's surface at a discrete wavelength (e.g., an infrared wavelength), the black body curve equation can be used to calculate the surface temperature, so long as the object or surface is accurately modeled by the theoretical black body. Unfortunately, however, many surfaces do not approximate a theoretical black body. Instead, many surfaces have surface features and reflectivities (e.g., emissivity) that are different both in magnitude and spectral shape of the surface emissions from an ideal black body. Such surfaces are termed "gray bodies". Furthermore, in some applications, the surface emissivity of a target changes rapidly. For instance, when materials are thermally processed in industrial applications, the materials may exhibit a rapidly changing surface emissivity.

Embodiments of the disclosed optical pyrometer systems are designed to measure surface temperatures of gray bodies and/or to compensate for varying surface emissivity. In particular, embodiments of the disclosed technology are capable of making optical temperature measurements that are independent of the surface emissivity of the object being measured. Embodiments of the disclosed technology can be used in a wide variety of applications, including the monitoring of temperature during the thermal processing of materials (such as steel, other alloys, or metals), the monitoring of temperature during high magnetic field processing of materials, or other high temperature industrial applications in which it is desirable to use an optical pyrometer (e.g., because the materials are moving as part of a production line or because it is otherwise impractical to use a pyrometer that contacts the material). For example, applications for embodiments of the disclosed system include measuring the temperature of small metal parts being heated as they pass through an induction heating zone during heat treatment; measuring the temperature of a continuous strip of metal, glass, or carbon fiber as the strip passes through a heating zone in a treatment process; measuring the temperature of a heated moving surface in a furnace; measuring the temperature of parts that are heated to temperatures above the ratings of contact thermocouples; and/or measuring the temperature of rotating or stationary parts in an engine (e.g., blades or vanes of a gas turbine engine). More generally, embodiments of the disclosed technology can be used in any application where it is desirable to measure the temperature of an object using a non-contact probe.

As more fully explained below, certain embodiments of the emissivity independent optical pyrometry technique allow absolute measurements of surface temperature using a non-contact optical pyrometer. For example, embodiments of the disclosed techniques allow surface temperatures between 300° C. and 1400° C. to be measured with a relatively high resolution (e.g., a resolution of less than 5° C.). Embodiments of the disclosed system use an optical fiber probe that allows measurements to be performed in challenging and relatively inaccessible environments. These include environments with high magnetic fields, radiation, and/or high temperatures. The non-contact optical pyrometer can be used to perform temperature measurements in open air and/or through clear windows. For example, embodiments of the disclosed optical pyrometery system and techniques can be used at a standoff distance of 1 inch or more (such as about 6 inches).

III. Exemplary Embodiments of the Disclosed Technology

Figure 2:
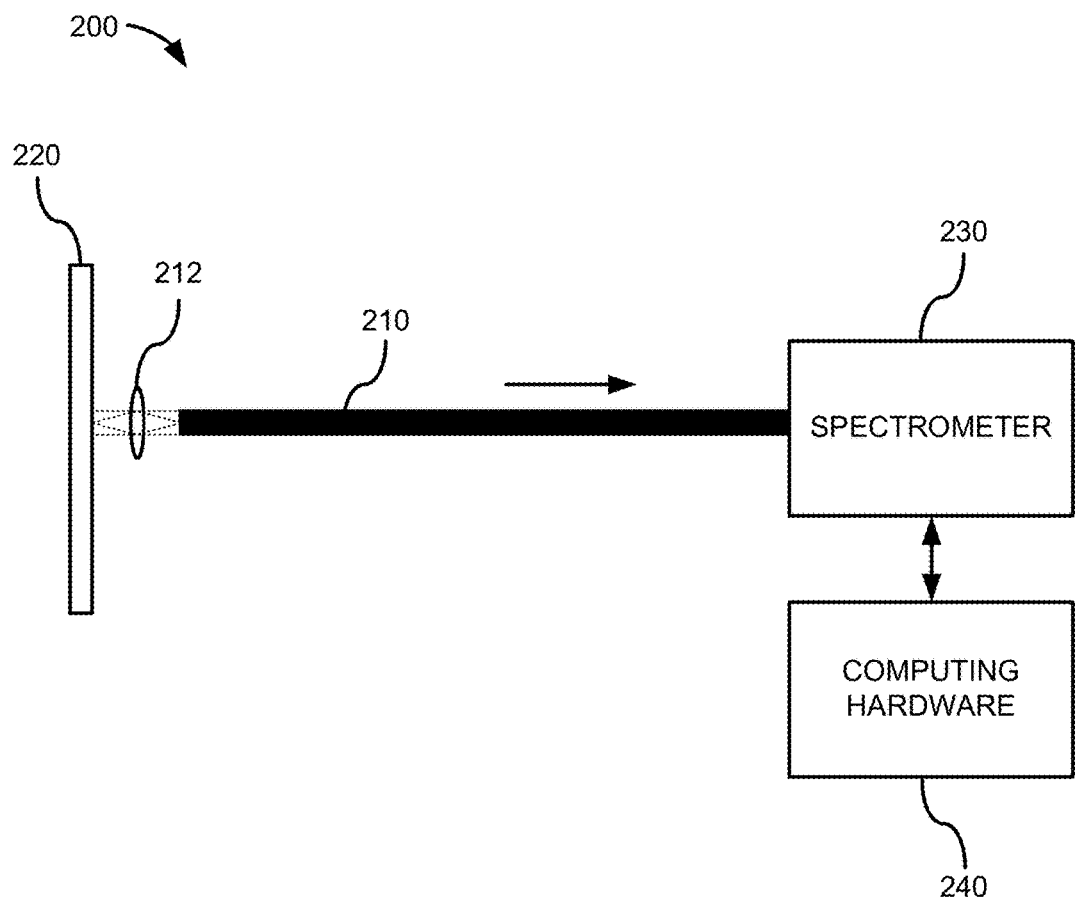
FIG. 2 is a schematic block diagram showing a first exemplary optical pyrometer system according to the disclosed technology.

FIG. 2 is a schematic block diagram that illustrates an exemplary system 200 according to the disclosed technology. The system 200 comprises an optical fiber 210 that collects light from the surface of a target 220. In the illustrated embodiment, a lens 212 is positioned adjacent to or at the end of the optical fiber 210 so as to better focus radiant light from the target 220 into the optical fiber 210. The optical fiber 210 can be any suitable, inflexible or flexible, optical fiber (e.g., silica, quartz, plastic, fluoride glass, phosphate glass, chalcogenide, or other such optical fiber made of any suitable material or glass). In some implementations, multiple bundled fibers are used. The system 200 includes the optical fiber 210 in part to allow for the object whose temperature is being measured to be separate from the remainder of the system. For example, there are many instances where a direct line of sight or free-space optics are not appropriate for a temperature measurement. Such would be the case, for instance, for items being heated in confined spaces for which a direct line of sight is blocked or for which movement or frequent geometry changes are experienced. For these cases, a fiber-based optical probe that points at the surface under test (such as the system 200) is advantageous.

One potential issue with optical fiber probes, however, is the limited pass spectrum. For silicon-based probes, for example, the upper wavelength limit is typically around 2500 nm. As shown by pass band 120 in FIG. 1, which illustrates the pass band for a typical silicon-based fiber, for a 1000° K (~750° C.) surface, the majority of the spectrum lies beyond the pass band of the fiber. Thus, in certain embodiments, it is desirable to efficiently and effectively use the range below 5000 nm (e.g., the range from about 900 to 2500 nm). As more fully discussed below, indium gallium arsenide (InGaAs) spectrometers can be efficiently used in such a pass band. It should be understood, however, that other optical fibers with other pass bands can be used in embodiments of the disclosed technology.

Further, and as more fully explained below with respect to FIG. 3, the system can include one or more optical fibers that are used to illuminate the target surface with light from an external light. In the embodiment illustrated in FIG. 2, the optical fiber 210 transmits the light emitted from the target surface to a spectrometer 230. For example, the end of the optical fiber 210 that is proximate to the target surface is oriented toward the surface, but not in contact with, the surface. In particular embodiments, the spectrometer is configured to measure the spectral distribution across a range of wavelengths that mostly lie in the lower quarter of the black body curve (e.g., from 700 nm to 5000 nm). For example, in one particular implementation, the spectrometer has sensitivity in the range between 900 nm to 2500 nm. It is to be understood that this range is not to be construed as limiting, as other ranges are possible (e.g., any range from between 100 nm and 5000 nm). In certain embodiments of the disclosed technology, the spectrometer is an indium gallium arsenide (InGaAs) spectrometer. However, it is to be understood that other types of detectors can be used as well. For instance, a silicon (Si) spectrometer, lead selenide (PbSe) spectrometer, indium antimonide (InSb) spectrometer, mercury cadmium telluride (HgCdTe) spectrometer, or a bolometer (e.g., a pyrometer-type bolometer or absolute bolometer) can be used. Still further, any combination or subcombination of such spectrometers or bolometers (including a combination with an InGaAs spectrometer) can be used in certain embodiments. Furthermore, in particular embodiments, the spectrometer is equipped with a thermoelectrically cooled InGaAs detector that limits the detector's dark noise.

The system 200 further comprises computational hardware 240 that is configured to receive data from the spectrometer (e.g., a plurality of intensity measurements across a plurality of wavelengths for a sample period) and to perform a curve fitting process to find a curve that matches the observed intensity measurements and from which the temperature of the surface can be determined. Example embodiments of the computational hardware 240 are described below with respect to FIGS. 10-11.

Figure 3:
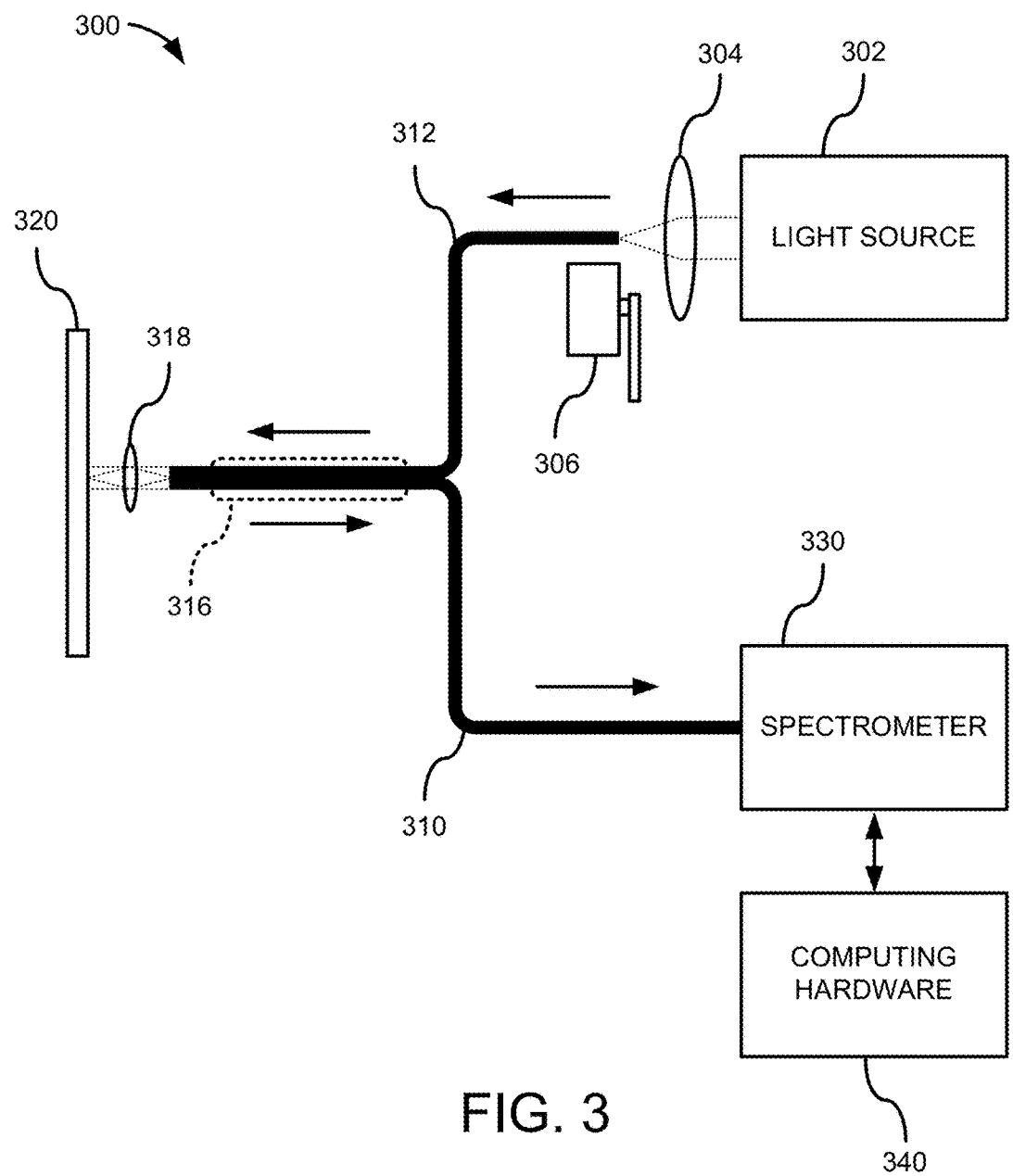
FIG. 3 is a schematic block diagram showing a second exemplary optical pyrometer system according to the disclosed technology.

FIG. 3 is a schematic block diagram that illustrates another exemplary system 300 according to the disclosed technology. In contrast to the system 200, the system 300 comprises an external light source 302 that is used to produce light that is transmitted to and illuminates a target 320. The external light source 302 can be any suitable light source, such as a broad spectrum light source (e.g., an unfiltered incandescent lamp). In some embodiments, the external light source is another multiple wavelength light source (e.g., two or more diodes generating light at different wavelengths) or a gas discharge light source (e.g., a xenon discharge light source). The system 300 further comprises one or more optical fibers 312 that are used to transmit light from the external light source 302 to the surface of the target 320. In the illustrated embodiment, a lens 304 is positioned adjacent to or at an end of the optical fibers 312 and used to help focus light from the external light source 302 into the optical fibers 312. Additionally, in some embodiments, the external light source 302 can be selectively turned "on" or "off" or the system 300 can include a mechanism for selectively blocking or allowing transmission of the light to the target. For instance, in the illustrated embodiment, a chopper 306 is positioned between an end of the optical fibers 320 and the external light source 302 and is used to selectively prevent light transmission form the external light source. The system 300 additionally comprises an optical fiber 310 that collects light from the surface of a target 320 and transmits the observed light to a spectrometer 330. Furthermore, the optical fibers 310, 312 can be bundled for at least some length (e.g., as illustrated by bundled length 316). For example, the optical fibers 310, 312 can be bundled so that the optical fiber 310 for receiving light from the target is at least partially surrounded by the one or more of the optical fibers 312 used to transmit light from the external light source 302 onto the target 320.

Figure 4:
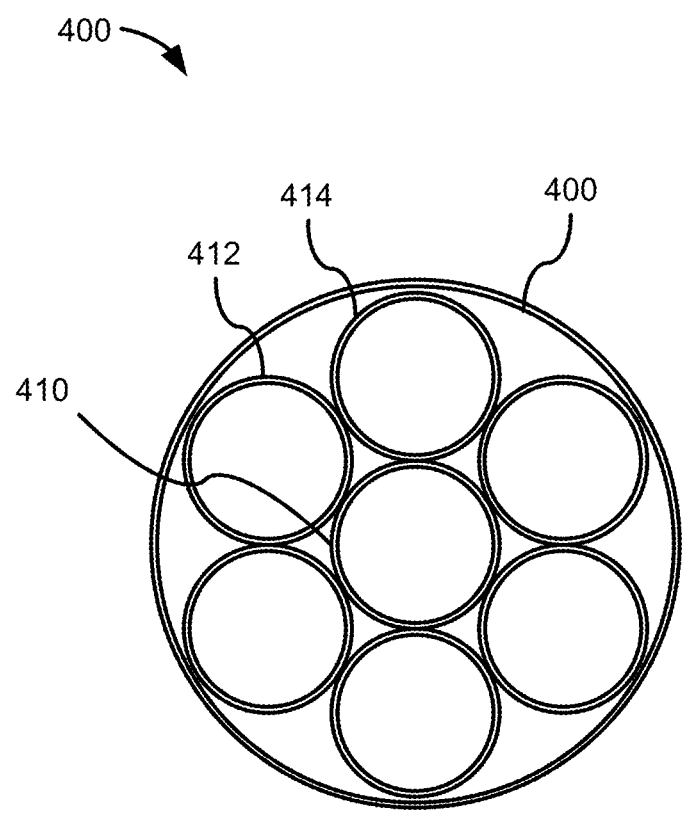
FIG. 4 is a cross-section of an exemplary fiber optical bundle as may be used in embodiments of the disclosed technology.

FIG. 4 is a schematic block diagram showing a cross-section of one example bundle 400 where a central optical fiber 410 is used to receive light from the target and transmit the observed light to a spectrometer, whereas surrounding optical fibers (such as optical fibers 412, 414) are used to transmit light onto the target from an external light source. The 6-around-1 arrangement shown in FIG. 4 is not to be construed as limiting, however, as any arrangement of optical fibers is possible, along with any number of optical fibers for receiving light from the target and for transmitting light onto the target. It should also be noted that, in some embodiments, one or more of the optical fibers operate to both transmit light from an external source and transmit reflected light from the surface of an object to the spectrometer.

Returning again to FIG. 3, in the illustrated embodiment, a lens 318 is positioned adjacent to or at an end of the optical fibers 310, 312 so as to better focus light from the external source 302 onto the target and to focus radiant light from the target 320 into the optical fiber 310. The optical fibers 310, 312 can be any suitable optical fiber, such as any of those described above with respect to FIG. 2. Also, the spectrometer 330 can be any suitable spectrometer, such as any of the spectrometers discussed above with respect to FIG. 2. The system 300 further comprises computational hardware 340 that is configured to receive data from the spectrometer 330 (e.g., a plurality of intensity measurements across a plurality of wavelengths) and to perform a curve fitting process to find a curve that matches the observed intensity measurements and from which the temperature of the surface can be determined. Example embodiments of the computational hardware 340 are described below with respect to FIGS. 10-11.

Figure 5:
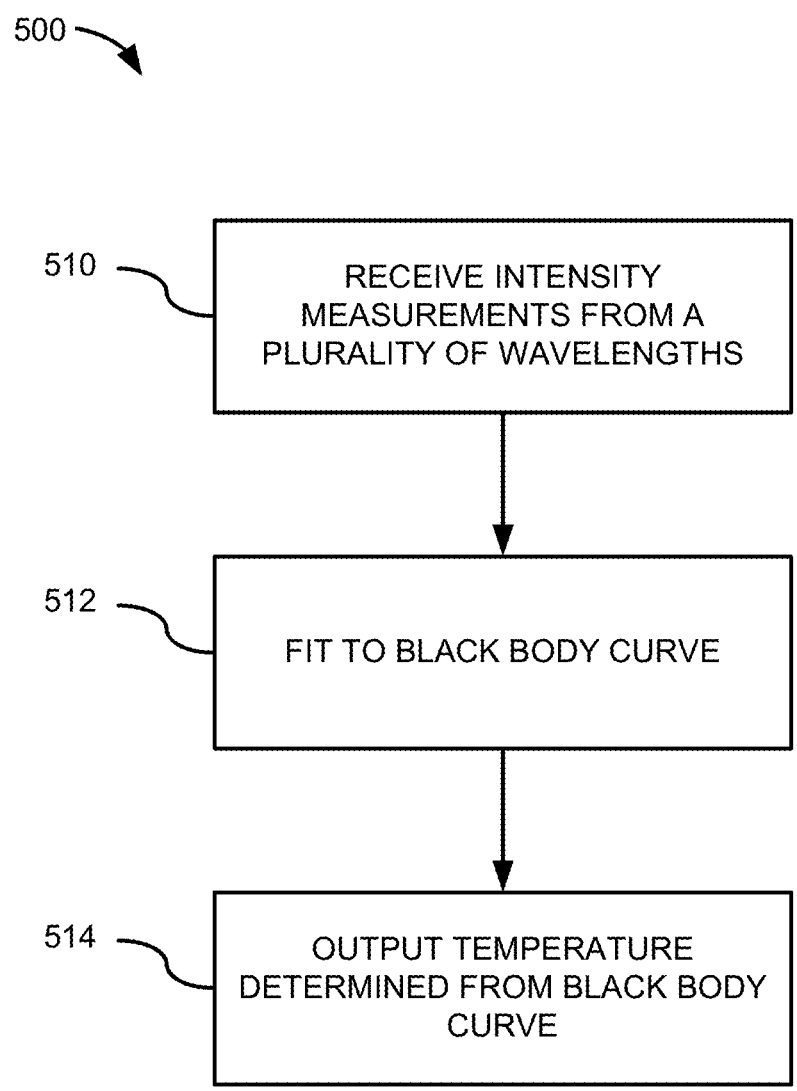
FIG. 5 is a flow chart of a generalized embodiment of computing temperature according to the disclosed technology.

FIG. 5 is a flow chart 500 illustrating a general method for computing the temperature of a surface using an optical pyrometer system in accordance with the disclosed technology. The method steps shown in FIG. 5 should not be construed as limiting, as any one or more of the method steps may be omitted, performed in a different order, or supplemented with one or more additional method steps.

At 510, a spectrum comprising a plurality of intensity measurements from a given time period is acquired by the spectrometer. The length of the time period (also referred to as the sampling period) can vary depending on the application and on the intensity of the black body emission. For instance, the time period can be from 10 ms to 10 seconds. In some implementations, the sampling period is in the range of 20 ms to 100 ms. The spectrum can comprise, for example, 512 observed intensity measurements or some other number depending on the resolution of the spectrometer, each measurement being from a different wavelength or group of wavelengths (e.g., at wavelengths between 100 and 5000 nm, such as between 900 and 2500 nm or any subrange within 100 and 5000 nm). In particular implementations, these measurements represent intensity values for a portion of a black body curve, such as from a range of values between 100 nm and 5000 nm (e.g., between 900 and 2500 nm or any subrange within 100 and 5000 nm). Referring back to FIG. 1, for instance, bracketed portion 120 illustrates a portion of the black body curve that is observed when the spectrometer obtains measurements from between about 900 nm and 2500 nm.

At 512, a black body curve is fitted to two or more of the observed intensity measurements from different wavelengths (e.g., to two or more observed data points, 10 or more observed data points, 20 or more observed data points, 100 or more observed data points, 256 or more observed data points, 512 observed data points, or all available observed data points). This process can be performed, for example, by computational hardware 240. Example implementations of this process are described in more detail below at FIG. 5. Although a gray body will produce an infrared spectrum which is different from the theoretical black body curve, the differences between the gray body curve and the black body curve are typically magnitude differences in localized areas of increased absorption. In general, however, the gray body curve is a scaled version of the black body curve (typically a scaled down version). Thus, the fitting method used to fit the black body curve in accordance with embodiments of the disclosed technology can include one or more scaling values to correct for the variance(s). In particular implementations, the derivatives of the gray body curve and the black body curve are the curves that are fit. Furthermore, as part of the fitting process, the temperature is a variable of the black body equation that is adjusted to fit the observed intensity measurements. Accordingly, in certain embodiments, determining a temperature of the black body curve is part of the curve fitting process. In some embodiments, a best fit is determined using any of a variety of curve fitting methods (e.g., using a Levenberg-Marquardt method to fit data smoothed with a Savitsky-Golay filter or other such suitable methodology). In other embodiments, a "fit" that is substantially the best fit is determined (e.g., within 2%, 5%, or 10% of the best fit).

At 514, the temperature determined from the fitting process is output. For example, the temperature can be displayed to a user on a display device, stored on a non-transitory computer-readable medium for later display or processing, or otherwise output for further processing or action.

Figure 6:
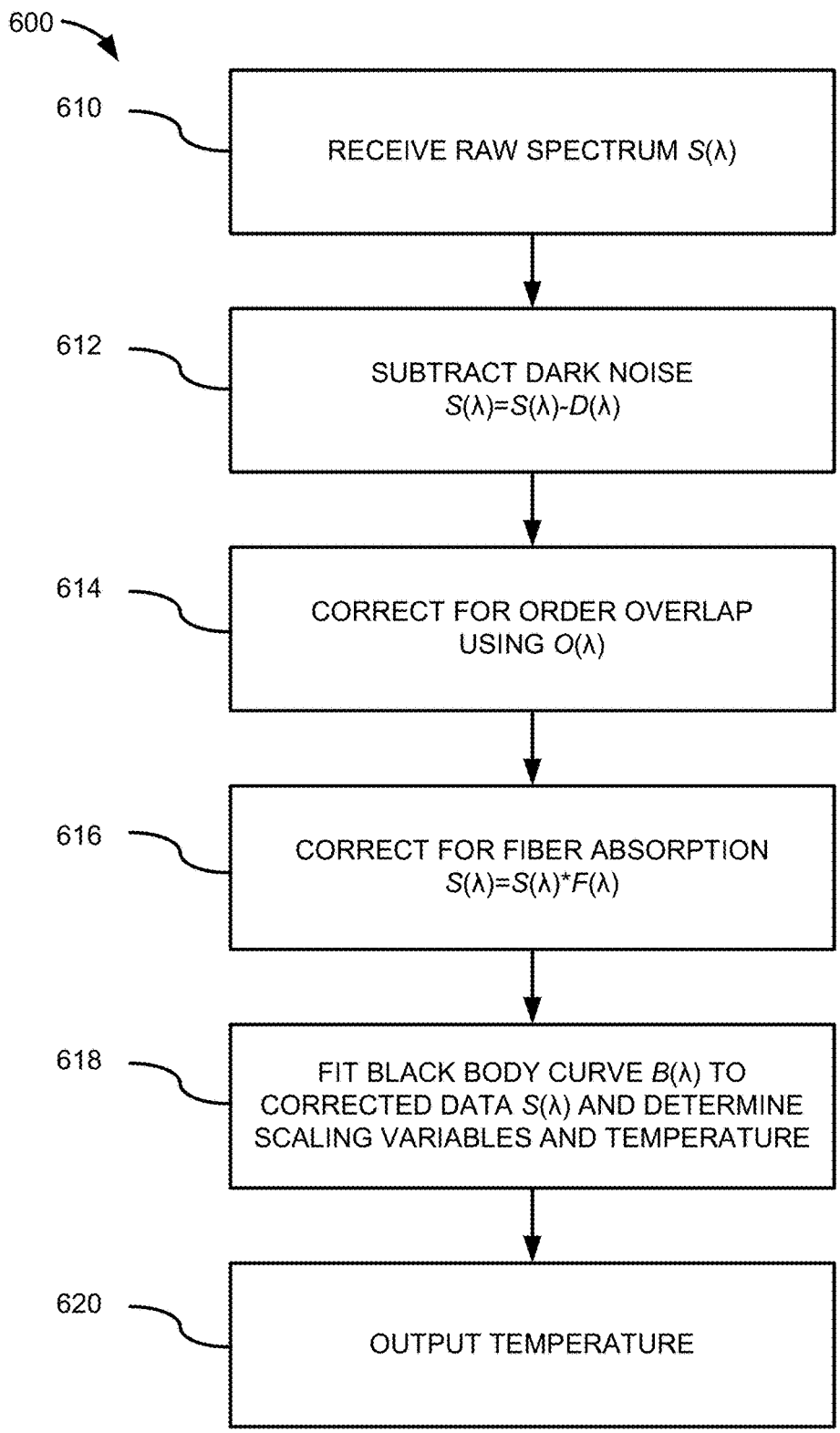
FIG. 6 is a flow chart of an exemplary embodiment of computing temperature according to the disclosed technology without an external light source.

FIG. 6 is a flow chart 600 of a more particular implementation of the general method shown in flow chart 500. Specifically, flow chart 600 shows an exemplary method for measuring temperature by fitting an observed spectrum of multiple wavelengths (or groups of wavelengths) to a generalized black body model in the absence of an external light source (e.g., using the system 200 shown in FIG. 2). The method steps shown in FIG. 6 should not be construed as limiting, as any one or more of the method steps may be omitted, performed in a different order, or supplemented with one or more additional method steps.

In the illustrated embodiment, certain measurements are taken with the system before the method shown in FIG. 6 is performed. These a priori measurements generally comprise baseline measurements that are used during the temperature computation process to remove or reduce background or noise data unrelated to the temperature of the object being measured. In particular implementations, for example, a dark noise baseline measurement $D(\lambda)$ of dark noise in the spectrometer, an order overlap efficiency baseline measurement $O(\lambda)$, or a fiber absorption baseline spectrum $F(\lambda)$ are taken before performance of the method shown in FIG. 6 (e.g., during instrument assembly or at some other pre-measurement time) and used to correct an observed spectral measurement. In other embodiments, one or more of these measurements are omitted and/or one or more other measurements are included. Any one or more of the dark noise measurement $D(\lambda)$, the order overlap efficiency measurement $O(\lambda)$, or the fiber absorption spectrum $F(\lambda)$ can be data stored in a non-transitory computer-readable memory or storage media in a format that allows for further processing (e.g., a suitable file, array, or data structure).

The dark noise in the spectrometer measurement $D(\lambda)$ can be measured by removing the spectrometer from the system and fully enclosing the spectrometer in a dark environment. In some implementations, this is performed by an internal shutter of the spectrometer. The captured signal is the "dark noise" resulting from electronic and/or thermal noise in the system itself. The measurement can be taken multiple times in order to determine an average measurement $D(\lambda)$.

The order overlap efficiency measurement $O(\lambda)$ is helpful because a spectrometer's internal diffraction grating typically produces overlapping sections of spectra. For a particular spectrometer groove spacing, wavelength, and incidence angle, the grating equation (which determines the angular locations of principal light intensity maxima) can be satisfied by more than one diffraction angle. This condition leads to the generation of multiple orders. Minimizing the overlap of higher orders is often a consideration in design of gratings. Light of a single wavelength incident on a grating can produce outputs at several angular positions corresponding to higher orders that also happen to be at the same angle as the lower orders of another distinctly different wavelength; thus, it becomes challenging to determine which wavelength contributed to the diffraction. The challenge is greater when the input spectra is large (e.g., when the input spectra includes multiple wavelengths). Unfortunately, minimizing order overlap and maximizing light efficiency are often a design trade off. Optical pyrometry often requires the high optical efficiency (low light losses) in order to maintain signal levels above the inherent noise of the detectors. Thus, order overlap is sacrificed for grating efficiency. The order overlap efficiency measurement $O(\lambda)$ measures the degree of order overlap so that compensation can be applied in the measurement process. In certain implementations, the order overlap efficiency measurement $O(\lambda)$ is measured by measuring the spectra of a broadband source with a dark-noise compensated spectrometer. The spectra can first be measured discretely by placing a sequence of flat-response optical filters in front of the source (e.g., optical fibers having a narrow spectral window, such as 100-200 nm, which may correspond to the resolution of the spectrometer). The spectra can then be built up using this method and compared to a single full spectrum measurement with the same spectrometer. The order overlap efficiency can then be calculated through an iterative calculation comparing the two spectral measurements.

Figure 8:
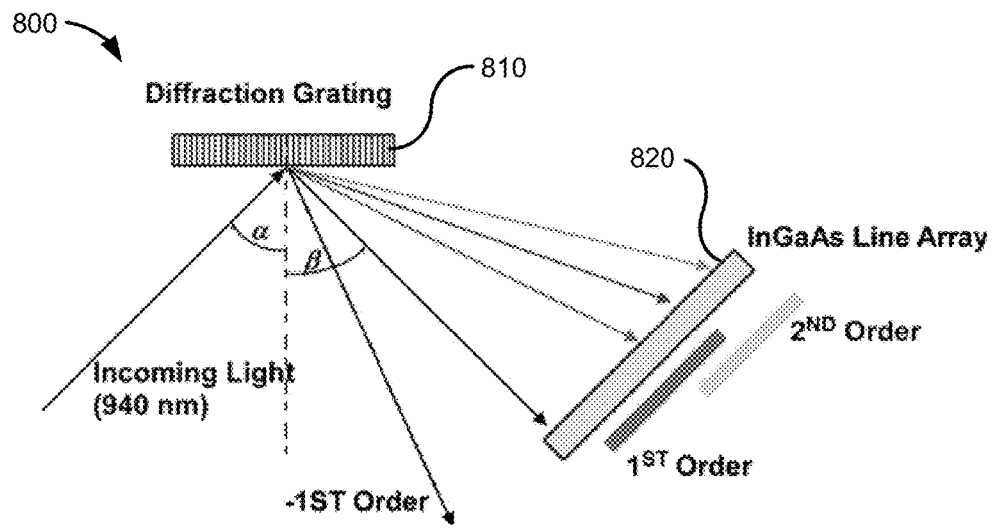
FIGS. 8 and 9 are block diagrams illustrating an exemplary order overlap correction computation.

FIG. 8 is a schematic block diagram 800 illustrating order overlap effects. As shown in the figure, incoming light in the near infrared spectrum (e.g., the narrow band centered around 940 nm) falls on a diffraction grating 810 with angle $\alpha$. The light emerges at angle $\beta$, which is the first order; however, other orders are present as well including negative ones. As shown in the figure, they also fall on detector line array 820.

The fiber absorption spectrum $F(\lambda)$ can be measured by transmitting a known spectrum through the one or more optical fibers in the systems and then measuring the output spectrum with a dark-noise- and order-overlap-compensated spectrometer. The ratio between the known input and the measured output spectra produces the fiber absorption spectrum $F(\lambda)$.

Returning to FIG. 6, at 610, a raw spectrum $S(\lambda)$ of light emitted by the surface of an object being measured is received by the spectrometer of the optical pyrometer system. The raw spectrum $S(\lambda)$ can be produced, for example, by the spectrometer 230 in system 200 for a sample period during which light emitted by the surface of an object 220 is measured. The raw spectrum $S(\lambda)$ (or any spectrum or any spectral measurement described herein) is typically in the form of data stored in non-transitory computer-readable memory or storage media in a format that allows for further processing (e.g., a file, array, or data structure storing the corresponding data values, including a wavelength or wavelength range and an intensity (expressed as a number of counts measured by the spectrometer for the sample period)).

At 612, the dark noise is removed from the received raw spectrum. For example, the dark noise spectrum $D(\lambda)$ can be used to compensate for dark noise. As illustrated in FIG. 6, the dark noise spectrum $D(\lambda)$ can be subtracted from the received raw spectrum $S(\lambda)$.

At 614, the received spectrum $S(\lambda)$ is corrected for order overlap effects. For example, the order overlap measurement $O(\lambda)$ can be used to correct the received spectrum $S(\lambda)$ (corrected for dark noise) for the order overlap effects of the spectrometer. In certain embodiments, the technique described in L. Bianchi and R. C. Bohlin, "Quantification of the Order Overlap Problem for IUE High Resolution Spectra (SWP Camera): A Correction Algorithm," *Astron. Astrophys.* 134, 31-35 (1984) is used to perform order overlap correction.

Figure 9:
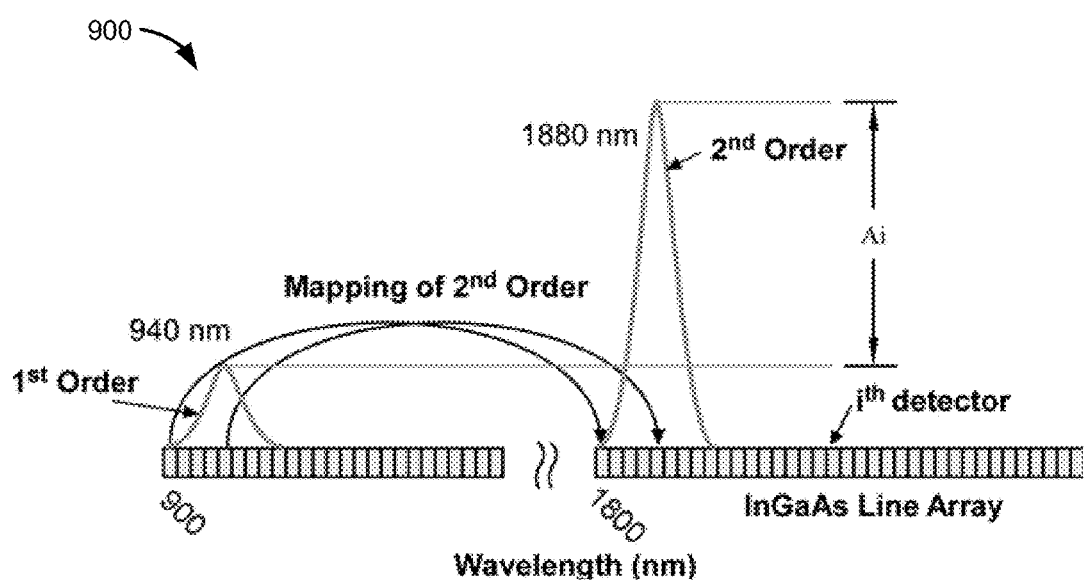

In further embodiments, the following computations are performed to complete the order overlap correction:

$$x_i' = (1+A_i)(x_i+n_i), \quad (2)$$

and $$x_{2i}' = x_{2i}+n_{2i}-A_i(x_i+n_i), \quad (3)$$

where $x_i$ is the measured count at the ith detector of the spectrometer, $x'$ is the corrected count, $A_i$ is the amplitude multiplicand between the $1^{st}$ and $2^{nd}$ order, and n is noise. For example, FIG. 9 is a schematic block diagram 900 illustrating the observed amplitudes observed between the $1^{st}$ and $2^{nd}$ orders shown in FIG. 8 and showing the amplitude multiplicand between the $1^{st}$ and $2^{nd}$ order. Of concern in FIG. 9 is the separation of overlap between the first and second order diffraction. Equations (2) and (3) can be used to subtract the signal resulting from $2^{nd}$ order diffraction. These equations can be applied because the system is bounded (e.g., incident light at shorter wavelengths than 900 nm is blocked by a filter and cannot contribute, and 3rd order and higher diffractions are beyond the line array detector). Thus by applying the equations pixel-by-pixel as indicated by the indexing variable, $x_i$, the $2^{nd}$ order contribution to the second half of the line array can be systematically subtracted.

At 614, the received spectrum is corrected for fiber absorption. For example, the fiber absorption spectrum $F(\lambda)$ can be used to compensate the received spectrum $S(\lambda)$ (corrected for dark noise and order overlap effects) for light absorption in the optical fiber used to transmit light from the object being measured to the spectrometer. For instance, the fiber absorption spectrum $F(\lambda)$ can be a ratio representing fiber absorption at each spectrometer wavelength (or group of wavelengths) and, as illustrated in FIG. 6, can be multiplied with the received spectrum (e.g., as corrected for dark noise and order overlap) in order to obtain the fiber absorption corrected spectrum.

At 618, the corrected spectrum (corrected for dark noise, order overlap, and fiber absorption) is fit to a black body curve. For example, in one exemplary embodiment, the corrected spectrum is fit to the following black body curve model:

$$B(\lambda) = K_1 \frac{2hc}{\lambda^3} \left( \frac{1}{e^{\frac{hc}{\lambda kT}} - 1} \right) + K_2, \quad (4)$$

where B is the spectral radiance at a wavelength $\lambda$, h is Planck's constant (J-s), c is the speed of light (m/s), k is Boltzmann's constant (J/K), T is temperature in degrees Kelvin, $K_1$ is a first scaling variable (and adjusts the slope and magnitude of the black body curve over a range of wavelengths), and $K_2$ is a second scaling variable (and serves to translate the black body curve to different radiant intensities). In particular implementations, the variables $K_1$, $K_2$, and T of the black body curve model of Equation (4) can be solved so that they "fit" the observed corrected spectrum within a selected tolerance of the best fit (e.g., within 2%, 5%, or 10% of the best fit) or so that they correspond to the best fit. A wide variety of techniques can be used to fit the black body curve model to the corrected spectrum, including least squares fitting methods, the Levenberg-Marquardt method, and/or Savitzky-Golay data smoothing techniques. As part of fitting the black body curve model to the corrected spectrum, the temperature T of the object being measured is determined.

By fitting the observed spectral intensities from multiple wavelengths (e.g., from a range of contiguous wavelengths) and fitting it to a scaled black body curve at the observed wavelengths (e.g., at the same wavelengths as observed), the temperature sensing process can be emissivity independent. For instance, the exemplary technique described above fits the overall shape of the observed curve to the overall shape of the corresponding portion of the black body, thus de-emphasizing the absolute intensities observed at a given wavelength while emphasizing the overall shape of the curve at a plurality wavelengths (e.g., across a range of contiguous wavelengths (such as from 100 to 5000 nm, or 900 to 2500 nm, or any subrange within 100 to 5000 nm)). In other words, the shape of the curve produced from the received spectrum is the determinant in computing temperature whereas absolute intensity is not a consideration (so long as a sufficient signal is generated from the emitting body).

At 620, the temperature T of the object being measured can be output. For example, the temperature can be displayed to a user on a display device, stored on a non-transitory computer-readable medium for later display or processing, or otherwise output for further processing or action.

In contrast to the technique described above with respect to FIG. 6, by using an external light source, spectral preferences of the measured surface or localized color changes on the measured surface can be corrected. For instance, although gray body correction is presumed to be non-preferential to wavelength, correction can be made for spectral preferences by the emitting surface or any component along the optical path. As more fully explained below, correction can be performed by transmitting a reference emission from a known light source through the optical fibers to the surface under test and transmitting the reflected light to the spectrometer. The known reference spectrum can then be compared with the actual received spectrum. A correction can be made by normalizing the measured spectrum with the known spectrum. Thus, any spectral nonlinearity in the fibers can be corrected as well as any changes in the emission of the surface under evaluation. This correction can be based on the assumption that the reflectivity is equivalent to emissivity on the surface. This correction can be made frequently or at longer intervals, depending on the expected changes of the measured surface. For example, an oxidizing surface may require frequent updates (e.g., multiple updates per second). The frequency of updating the surface reflectivity, however, will vary depending on the application.

The known emission source may be either another black body radiator or one or more emitters such as light emitting diodes, whose spectral outputs are strategically placed. For example, the external light source can be a broad spectrum light source (e.g., an unfiltered incandescent lamp) or another multiple wavelength light source, such as two or more light emitting diodes generating light at different wavelengths.

The correction can be performed by periodically adding the reference to the existing emission spectrum of the surface under test. For the interval that the reference is added, the black body fitting process can be paused and the comparison made with the known spectrum of the reference. Several methods can be used for the initial calibration, including allowing the fiber optic probe tip to see only a reflective surface. This action would serve to calibrate the optical channel (without the test surface).

Figure 7A:
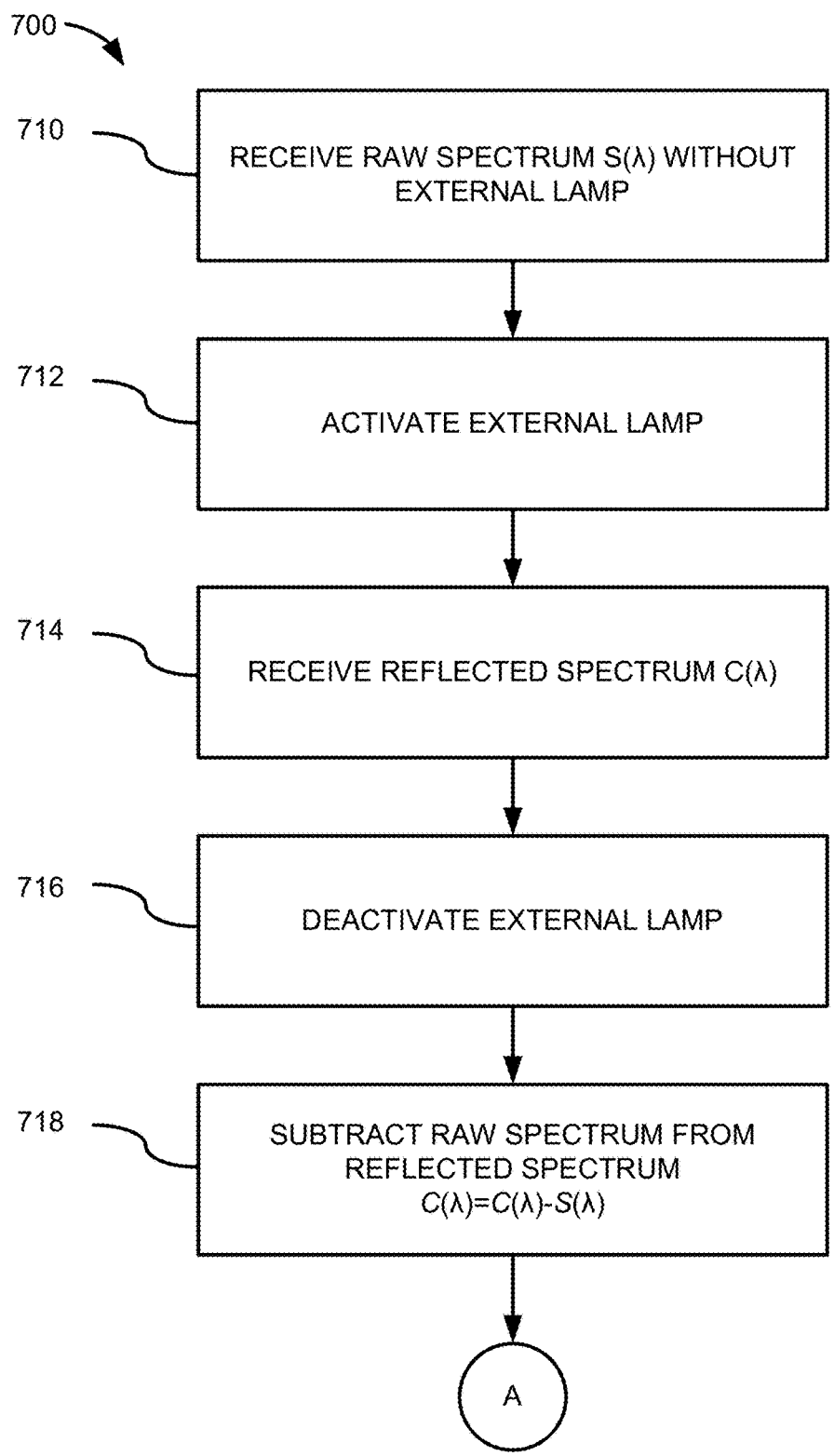

FIG. 7 is a flow chart 700 of an exemplary method for measuring temperature by fitting an observed spectrum of multiple wavelengths (or groups of wavelengths) to a generalized black body model, where the observed spectrum is corrected for surface reflectance using an external light source (e.g., using the system 300 shown in FIG. 3). The method steps shown in FIG. 7 should not be construed as limiting, as any one or more of the method steps may be omitted, performed in a different order, or supplemented with one or more additional method steps.

In the illustrated embodiment, certain measurements are taken with the system before the method shown in FIG. 7 is performed. These a priori measurements generally comprise baseline measurements that are used during the process to remove or reduce background or noise data unrelated to the temperature of the object being measured. In particular implementations, for example, a dark noise baseline measurement $D(\lambda)$ of dark noise in the spectrometer, an order overlap efficiency baseline measurement $O(\lambda)$, a fiber absorption baseline spectrum $F(\lambda)$, and/or a low-temperature material reflectance baseline measurement $R(\lambda)$ are taken before performance of the method shown in FIG. 7 (e.g., during instrument assembly or at some other pre-measurement time). In other embodiments, one or more of these measurements is omitted and/or one or more other measurements are included. Any one or more of the dark noise measurement $D(\lambda)$, the order overlap efficiency measurement $O(\lambda)$, the fiber absorption spectrum $F(\lambda)$, or the low-temperature material reflectance spectrum $R(\lambda)$ can be data stored in a non-transitory computer-readable memory or storage media in a format that allows for further processing (e.g., a suitable file, array, or data structure).

The dark noise measurement $D(\lambda)$, the order overlap efficiency measurement $O(\lambda)$, and/or the fiber absorption spectrum $F(\lambda)$ can be computed as described above with respect to FIG. 6. The low-temperature material reflectance measurement $R(\lambda)$ can be computed by emitting light from the external light source onto the sample surface (e.g., through the one or more optical fibers used for transmission of light from the external to the surface). When the sample is at room temperature, the spectrum of light reflected from the surface can be collected by the optical fibers, sent to the spectrometer, and stored as material reflectance spectrum $R(\lambda)$.

Returning to FIG. 7, at 710, a raw spectrum $S(\lambda)$ of light emitted by the surface of an object being measured is received by the spectrometer of the optical pyrometer system. In the illustrated embodiment, the raw spectrum $S(\lambda)$ is the spectrum of light emitted from the object without any additional external light. The raw spectrum $S(\lambda)$ can be produced, for example, by the spectrometer 330 in system 300 for a sample period during which light emitted by the object 320 is measured.

At 712, the external light is activated. For example, in one implementation, a shutter on the external light source is opened.

At 714, the reflected spectrum $C(\lambda)$ of light emitted by the surface of an object upon illumination from the external lamp is received by the spectrometer of the optical pyrometer system. In the illustrated embodiment, the reflected spectrum $C(\lambda)$ is the spectrum of light emitted from the object while illuminated by the additional external light source. The reflected spectrum $C(\lambda)$ can be captured, for example, by the spectrometer 330 in system 300 for a sample period during which light emitted by the object 320 is measured and during which the object 320 is illuminated by the external light source.

At 716, the external light is deactivated. For example, in one implementation, a shutter on the external light source is closed.

At 718, the raw spectrum $S(\lambda)$ is subtracted from the reflected spectrum $C(\lambda)$ to create a corrected reflected spectrum. This process also corrects for dark noise in the reflected spectrum $C(\lambda)$.

At 720, dark noise is removed from the raw spectrum $S(\lambda)$. For example, the dark noise spectrum $D(\lambda)$ can be used to compensate for dark noise. As illustrated in FIG. 7, the dark noise spectrum $D(\lambda)$ can be subtracted from the raw spectrum $S(\lambda)$.

At 722, the raw spectrum $S(\lambda)$ and the reflected spectrum $C(\lambda)$ are further corrected for order overlap effects. Any of the order overlap correction techniques described above can be used to correct for order overlap effects.

At 724, the raw spectrum $S(\lambda)$ is further corrected for fiber absorption. For example, the fiber absorption spectrum $F(\lambda)$ can be used to compensate for dark noise. For instance, the fiber absorption spectrum $F(\lambda)$ can be a ratio representing fiber absorption at each spectrometer wavelength and, as illustrated in FIG. 7, can be multiplied with the raw spectrum $S(\lambda)$ (e.g., as corrected for dark noise and order overlap) in order to obtain the fiber absorption corrected spectrum.

At 726, the raw spectrum $S(\lambda)$ (corrected for dark noise, order overlap, and fiber absorption) is further corrected for surface reflectance changes using the reflectance spectrum $R(\lambda)$ (corrected for dark noise and order overlap and with the raw spectrum subtracted out). As illustrated in FIG. 7, the ratio of the reflectance spectrum $C(\lambda)$ (corrected for dark noise and order overlap and with the raw spectrum subtracted out) over the low-temperature material reflectance spectrum $R(\lambda)$ can be multiplied by the raw spectrum $S(\lambda)$ in order to produce a further corrected spectrum (corrected for dark noise, order overlap, fiber absorption, and surface reflectance). In particular implementations, the values of the ratio of $C(\lambda)/R(\lambda)$ are normalized to a maximum value of "1".

At 728, the corrected raw spectrum $S(\lambda)$ (corrected for dark noise, order overlap, fiber absorption, and surface reflectance) is fit to a black body curve. For example, in one exemplary embodiment, the corrected spectrum is fit to the black body curve model in Equation (4) above. In particular implementations, the scaling variables $K_1$ and $K_2$ and temperature T of the black body curve model of Equation (4) can be solved so that they "fit" the observed corrected spectrum within a selected tolerance of the best fit (e.g., within 2%, 5%, or 10% of the best fit) or correspond to the "best fit". A wide variety of techniques can be used to solve to fit the black body curve model to the corrected spectrum, including least squares fitting methods, the Levenberg-Marquardt method, and/or Savitzky-Golay data smoothing techniques. As part of fitting the black body curve model to the corrected spectrum, the temperature T of the object being measured is determined.

At 730, the temperature T of the object being measured can be output. For example, the temperature can be displayed to a user on a display device, stored on a non-transitory computer-readable medium for later display or processing, or otherwise output for further processing or action.

IV. Exemplary Computing Environments for Implementing Embodiments of the Disclosed Technology Any of the disclosed methods can be implemented as computer-executable instructions stored on one or more computer-readable media (e.g., one or more optical media discs, volatile memory components (such as DRAM or SRAM), or nonvolatile memory components (such as hard drives)) and executed on a computer (e.g., any suitable computer, including desktop computers, servers, smart phones, tablet computers, netbooks, or other devices that include computing hardware). Any of the computer-executable instructions for implementing the disclosed techniques as well as any data created and used during implementation of the disclosed embodiments can be stored on one or more computer-readable media (e.g., non-transitory computer-readable media). The computer-executable instructions can be part of, for example, a dedicated software application or a software application that is accessed or downloaded via a web browser or other software application (such as a remote computing application). Such software can be executed, for example, on a single local computer or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, Python, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods can also be implemented by specialized computing hardware that is configured to perform any of the disclosed methods. For example, the disclosed methods can be implemented (entirely or at least in part) by an integrated circuit (e.g., an application specific integrated circuit ("ASIC") or programmable logic device ("PLD"), such as a field programmable gate array ("FPGA")). The integrated circuit can be embedded in or directly coupled to an electrical device having a suitable display device.

Figure 10:
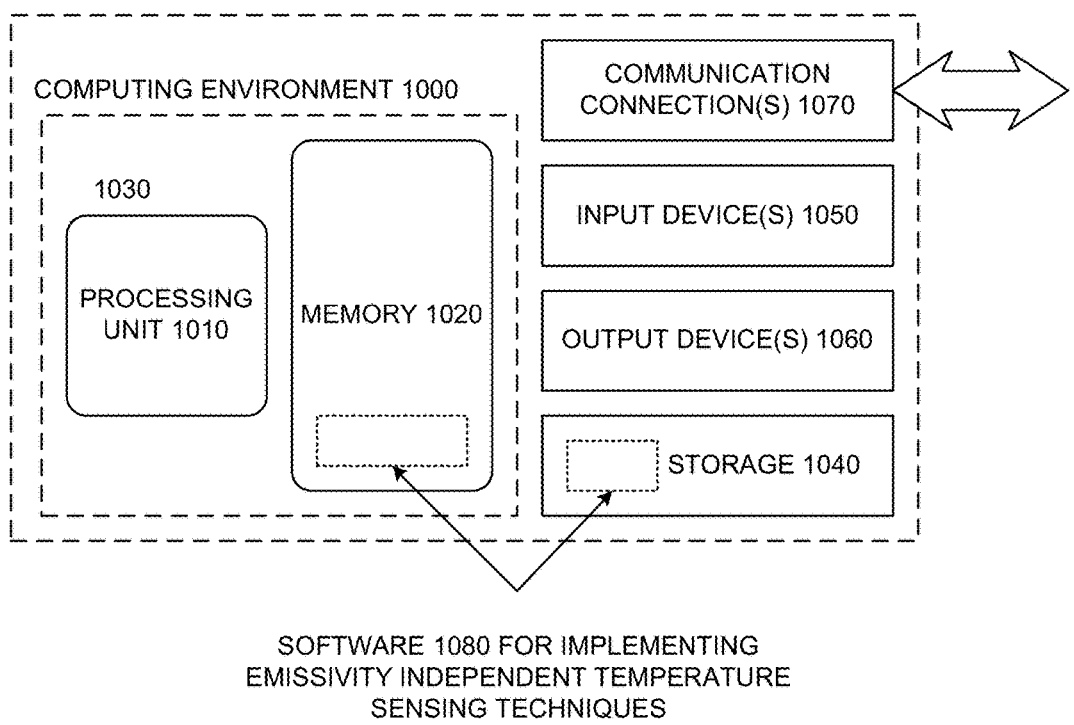
FIG. 10 is a block diagram illustrating a computing environment in which aspects of the disclosed technology can be performed.

FIG. 10 illustrates a generalized example of a suitable computing environment 1000 in which several of the described embodiments can be implemented. The computing environment 1000 is not intended to suggest any limitation as to the scope of use or functionality of the disclosed technology, as the techniques and tools described herein can be implemented in diverse general-purpose or special-purpose environments that have computing hardware.

With reference to FIG. 10, the computing environment 1000 includes at least one processing unit 1010 and memory 1020. In FIG. 10, this most basic configuration 1030 is included within a dashed line. The processing unit 1010 executes computer-executable instructions. In a multi-processing system, multiple processing units execute computer-executable instructions to increase processing power. The memory 1020 may be volatile memory (e.g., registers, cache, RAM), non-volatile memory (e.g., ROM, EEPROM, flash memory), or some combination of the two. The memory 1020 stores software 1080 implementing one or more of the described emissivity independent temperature sensing tools or techniques described herein. For example, the memory 1020 can store software 1080 for implementing any of the disclosed techniques described herein and their accompanying user interfaces.

The computing environment can have additional features. For example, the computing environment 1000 includes storage 1040, one or more input devices 1050, one or more output devices 1060, and one or more communication connections 1070. An interconnection mechanism (not shown) such as a bus, controller, or network interconnects the components of the computing environment 1000. Typically, operating system software (not shown) provides an operating environment for other software executing in the computing environment 1000, and coordinates activities of the components of the computing environment 1000.

The storage 1040 can be removable or non-removable, and includes magnetic disks, magnetic tapes or cassettes, CD-ROMs, DVDs, or any other tangible non-transitory non-volatile memory or storage medium which can be used to store information and which can be accessed within the computing environment 1000. The storage 1040 can also store instructions for the software 1080 implementing any of the described techniques, systems, or environments.

The input device(s) 1050 can be a touch input device such as a keyboard, touchscreen, mouse, pen, trackball, a voice input device, a scanning device, or another device that provides input to the computing environment 1000. The output device(s) 1060 can be a display device (e.g., a computer monitor, smartphone display, tablet display, netbook display, or touchscreen), printer, speaker, or another device that provides output from the computing environment 1000.

The communication connection(s) 1070 enable communication over a communication medium to another computing entity. The communication medium conveys information such as computer-executable instructions, compressed or uncompressed image data, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

As noted, the various methods can be described in the general context of computer-readable instructions stored on one or more computer-readable media. Computer-readable media are any available media that can be accessed within or by a computing environment. By way of example, and not limitation, with the computing environment 1000, computer-readable media include tangible non-transitory computer-readable media such as memory 1020 and/or storage 1040.

The various methods disclosed herein can also be described in the general context of computer-executable instructions, such as those included in program modules, being executed in a computing environment by a processor. Generally, program modules include routines, programs, libraries, objects, classes, components, data structures, and so on that perform particular tasks or implement particular abstract data types. The functionality of the program modules may be combined or split between program modules as desired in various embodiments. Computer-executable instructions for program modules may be executed within a local or distributed computing environment.

Figure 11:
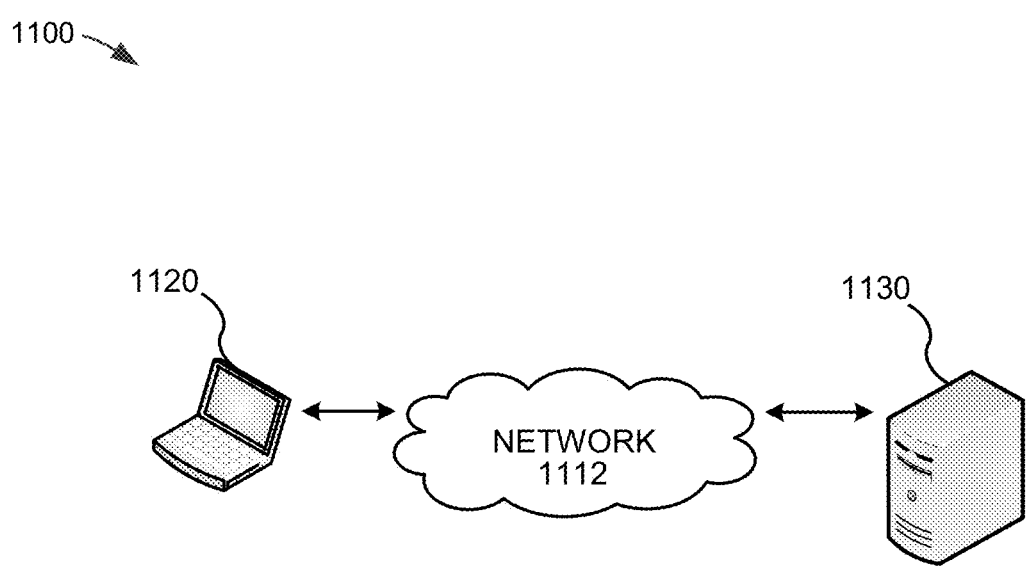
FIG. 11 is a block diagram showing an exemplary network environment in which aspects of the disclosed technology can be performed.

An example of a possible network topology 1100 (e.g., a client-server network) for implementing a system according to the disclosed technology is depicted in FIG. 11. Networked computing device 1120 can be, for example, a computer running a browser or other software connected to a network 1112. The computing device 1120 can have a computer architecture as shown in FIG. 10 and discussed above. The computing device 1120 is not limited to a traditional personal computers but can comprise other computing hardware configured to connect to and communicate with a network 1112 (e.g., smart phones or other mobile computing devices, servers, network devices, dedicated devices, and the like). In the illustrated embodiment, the computing device 1120 is configured to communicate with a server 1130 (e.g., a remote server) via a network 1112. In the illustrated embodiment, the computing device 1120 is configured to transmit input data to the server 1130 and the server 1130 is configured to implement any of the disclosed methods and provide results to the computing device 1120. Any of the data received from the computing device 1130 can be stored or displayed on the computing device 1120 (e.g., displayed as data on a graphical user interface or web page at the computing devices 1120). In the illustrated embodiments, the illustrated networks 1112 can be implemented as a Local Area Network ("LAN") using wired networking (e.g., the Ethernet IEEE standard 802.3 or other appropriate standard) or wireless networking (e.g. one of the IEEE standards 802.11a, 802.11b, 802.11g, or 802.11n or other appropriate standard). Alternatively, at least part of the networks 1112 can be the Internet or a similar public network and operate using an appropriate protocol (e.g., the HTTP protocol).

Having illustrated and described the principles of the disclosed technology, it will be apparent to those skilled in the art that the disclosed embodiments can be modified in arrangement and detail without departing from such principles. For example, any one or more aspects of the disclosed technology can be applied in other embodiments. In view of the many possible embodiments to which the principles of the disclosed technologies can be applied, it should be recognized that the illustrated embodiments are only preferred examples of the technologies and should not be taken as limiting the scope of the invention. Rather, the scope of the invention is defined by the following claims. We therefore claim as our invention all that comes within the scope and spirit of these claims.

We claim:

1. A method implemented by computing hardware, comprising the steps of:
    receiving a plurality of spectral radiance measurements at a plurality of wavelengths from a surface of an object;
    receiving a surface reflectance measurement from the surface of the object;
    correcting the received plurality of spectral radiance measurements for surface reflectance changes by multiplying the plurality of spectral radiance measurements with a ratio of the surface reflectance measurement over a low-temperature material reflectance spectrum of the object to produce corrected spectral radiance measurements;
    fitting the plurality of the corrected spectral radiance measurements to a scaled version of a black body curve, with the computing hardware, wherein the fitting step comprises determining a temperature of the scaled version of the black body curve; and
    outputting the temperature for the scaled version of the black body curve that fits the plurality of the corrected spectral radiance measurements.

2. The method of claim 1, wherein the wavelengths in the plurality of wavelengths are contiguous wavelengths.

3. The method of claim 1, further comprising the step of correcting the received plurality of spectral radiance measurements for one or more of dark noise, order overlap effects, or optical fiber absorption.

4. The method of claim 1, wherein the plurality of spectral radiance measurements is received from an indium gallium arsenide spectrometer.

5. The method of claim 1, wherein the fitting step comprises determining two or more scaling variables of the scaled version of the black body curve.

6. The method of claim 1, wherein the fitting step is performed using the Levenberg-Marquardt technique to fit data smoothed with a Savitsky-Golay filter.

7. The method of claim 1, wherein the fitting step is performed independent of emissivity variations on the surface of the object observed at one or more of the wavelengths.

8. The method of claim 1, wherein the method further comprises, before the fitting step, the step of obtaining one or more of a dark noise baseline measurement, an order overlap baseline measurement, or a fiber absorption baseline measurement.

9. The method of claim 8, wherein the method further comprises, before the fitting step, the step of obtaining the low-temperature surface reflectance measurement from the surface of the object when the object is at a temperature lower than at the time of the receiving the plurality of spectral radiance measurements.

10. One or more non-transitory computer-readable media storing computer-executable instructions which, when executed by a computer, cause the computer to perform the method of claim 1.

11. A system for performing optical pyrometry, comprising:
   an optical fiber, the optical fiber having a first end and a second end, the first end of the optical fiber being oriented toward, but not contacting, a surface of an object whose temperature is to be measured;
   a spectrometer, the spectrometer being coupled with the second end of the optical fiber and configured to receive light transmitted by the optical fiber and emitted by the surface of the object, the spectrometer being further configured to produce spectral radiance measurements across a range of different wavelengths, the spectrometer being further configured to receive light reflected by the surface of the object and produce spectral reflectance measurements; and
   computing hardware communicatively coupled to the spectrometer, the computing hardware being configured to receive the spectral radiance measurements from across the range of different wavelengths, correct the spectral radiance measurements for surface reflectance changes by multiplying the spectral radiance measurements with a ratio of the spectral reflectance measurements over a low-temperature material spectrum of the object to produce corrected spectral radiance measurements, and determine one or more variables of a black body curve model so that the black body curve model fits the corrected spectral radiance measurements, the one or more variables including temperature.

12. The system of claim 11, wherein the spectrometer is one of an indium gallium arsenide spectrometer, a silicon spectrometer, a lead selenide spectrometer, an indium antimonide spectrometer, a mercury cadmium telluride spectrometer, or a bolometer.

13. The system of claim 11, wherein the spectrometer is configured to produce spectral radiance measurements in a range from within 700 nm to 5000 nm.

14. The system of claim 13, wherein the spectrometer is configured to produce spectral radiance measurements in a range from within 900 nm to 2500 nm.

15. The system of claim 11, wherein the optical fiber has a pass band in a range from within 100 nm to 5000 nm.

16. The system of claim 11, wherein the different wavelengths in the range of different wavelengths are contiguous wavelengths.

17. A system for performing optical pyrometry, comprising:
   a bundle of one or more optical fibers, the bundle of optical fibers having an end oriented toward, but not contacting, a surface of an object whose temperature is to be measured, the bundle comprising a first set of one or more of the optical fibers having a first end opposite the end oriented toward the surface of the object, the bundle further comprising a second set of one or more of the optical fibers having a second end opposite the end oriented toward the surface of the object;
   an illumination source, the first end of the first set of one or more of the optical fibers being positioned adjacent to the illumination source such that light from the illumination source is transmissible through the first set of one or more of the optical fibers to illuminate the surface of the object;
   a spectrometer, the spectrometer being coupled to the second end of the second set of one or more of the optical fibers, the spectrometer being configured to receive light emitted by the surface of the object, the spectrometer being further configured to produce spectral radiance measurements across a range of different wavelengths; and
   computing hardware communicatively coupled to the spectrometer, the computing hardware being configured to receive the spectral radiance measurements from across the range of different wavelengths and determine one or more variables of a black body curve model so that the black body curve model fits the received spectral radiance measurements, the one or more variables including temperature.

18. The system of claim 17, wherein the different wavelengths in the range of different wavelengths are contiguous wavelengths.

19. The system of claim 17, wherein the illumination source is a broad spectrum light source.

20. The system of claim 17, wherein the one or more of the optical fibers in the first set are located central to the one or more optical fibers in the second set.

21. The system of claim 17, wherein the light from the illumination source can be selectively transmitted to the surface of the object.

22. A method implemented by computing hardware in an optical pyrometry system, comprising:
   receiving a spectrum of radiance measurements at a plurality of wavelengths from a surface of an object being measured;
   receiving a reflectance spectrum from the surface of the object being measured;
   correcting the radiance spectrum for (a) dark noise in the optical pyrometry system, (b) spectrometer order overlap, and (c) absorption in optical fibers used to transmit the radiance spectrum, and thereby producing a corrected radiance spectrum;
   further correcting the corrected radiance spectrum for surface reflectance changes by multiplying the corrected radiance spectrum with a ratio of the reflectance spectrum over a low-temperature material reflectance spectrum of the object; and
   fitting the corrected radiance spectrum to a black body curve model, wherein the fitting comprises determining a temperature of the black body curve model.

23. The method of claim 22, wherein the method further comprises, before the fitting, obtaining a dark noise baseline measurement, an order overlap baseline measurement, and a fiber absorption baseline measurement.

24. One or more non-transitory computer-readable media storing computer-executable instructions which when executed by a computer cause the computer to perform the method of claim 22.

25. A method implemented by computing hardware in an optical pyrometry system, comprising:
   receiving a first spectrum of radiance measurements at a plurality of wavelengths from a surface of an object being measured;
   transmitting light from an external light source onto the surface of the object being measured;
   receiving a second spectrum of radiance measurements at the plurality of wavelengths from the surface of the object being measured as the object is illuminated by the external light source;
   correcting the first spectrum for surface reflectance changes and thereby generating a corrected spectrum, the correcting the first spectrum being based at least in part on the second spectrum and including multiplying the corrected spectrum with a ratio of the second spectrum over a low-temperature material reflectance spectrum of the object; and fitting the corrected spectrum to a black body curve model, wherein the fitting comprises determining a temperature of the black body curve model.

26. The method of claim 25, wherein the correcting further comprises correcting the first spectrum for (a) dark noise in the optical pyrometry system, (b) spectrometer order overlap, and (c) absorption in optical fibers used to transmit the spectrum.

27. The method of claim 25, wherein the method further comprises, before the fitting, obtaining the low-temperature material reflectance spectrum of the object at room temperature.

28. The method of claim 25, wherein the method further comprises, before the fitting, obtaining a dark noise baseline measurement, an order overlap baseline measurement, and a fiber absorption baseline measurement.

29. One or more non-transitory computer-readable media storing computer-executable instructions which when executed by a computer cause the computer to perform the method of claim 25.

* * * * *